Patented July 20, 1948

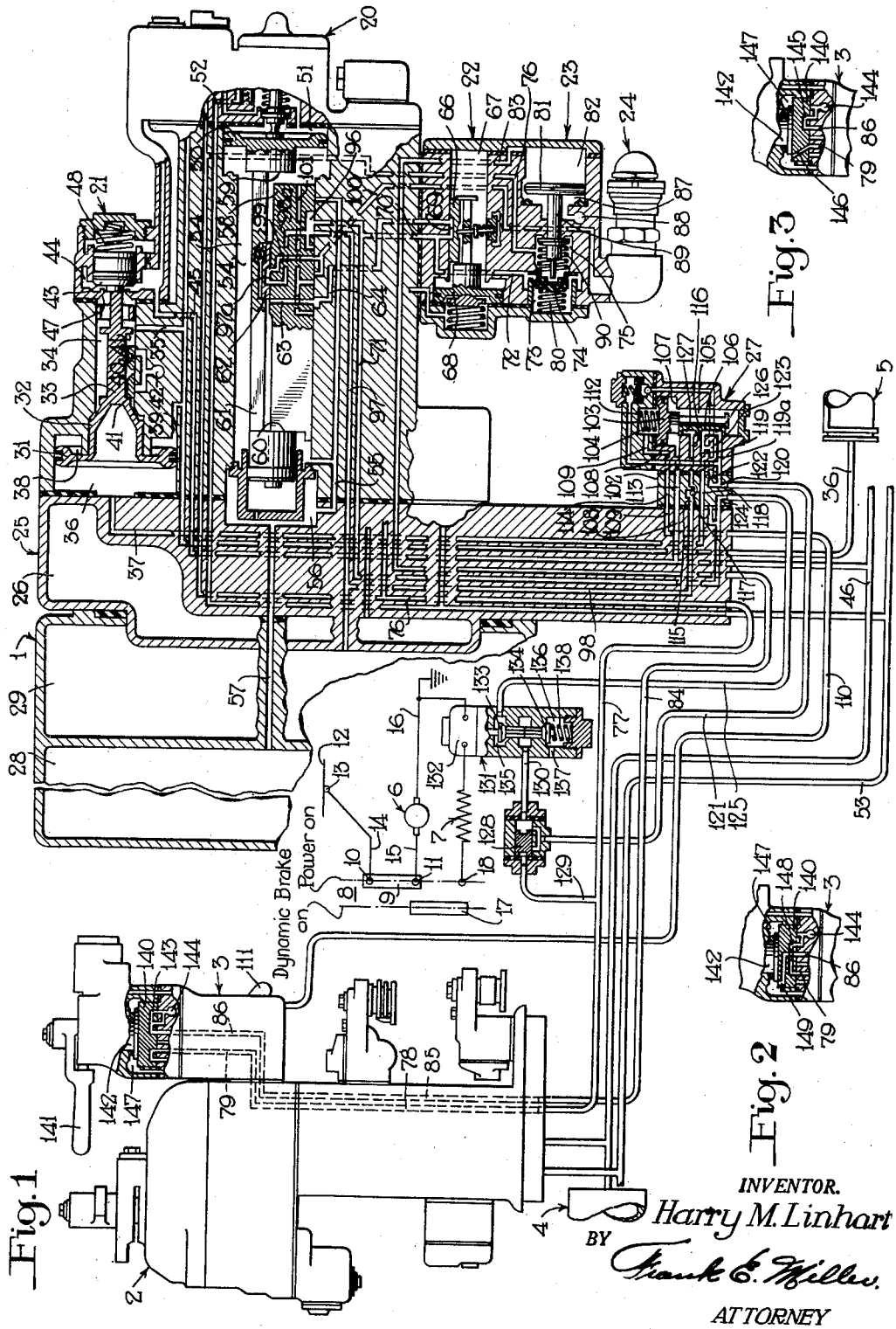

2,445,680

UNITED STATES PATENT OFFICE 2,445,680

BRAKE APPARATUS

Harry M. Linhart, Pitcairn, Pa., assignor to The Westinghouse Air Brake Company, Wilmerding, Pa., a corporation of Pennsylvania Application June 21, 1946, Serial No. 678,412

6 Claims. (Cl. 303—3)

This invention relates to brake apparatus and more particularly to brake apparatus for a locomotive of the electrically propelled type.

Certain electric locomotives are equipped with Westinghouse Air Brake Co.'s No. 8 ET locomotive brake equipment for braking the locomotive pneumatically, and the electric propulsion motors on the locomotive are arranged to operate as generators for supplying electric current to a dynamic brake resistor for providing electric braking.

The No. 8 ET locomotive brake equipment comprises a distributing valve device and an engineer's brake valve device consisting of an automatic portion and an independent portion. The automatic portion is provided for reducing pressure of fluid in the usual brake pipe to cause operation of the distributing valve device on the locomotive and of triple valves or the like on cars of a train for effecting an automatic application of the fluid pressure brakes thereon, while the independent portion is provided to effect operation of the distributing valve device to apply and release the pneumatic or fluid pressure brakes on the locomotive independently of the brakes on the cars of the train. If both the fluid pressure brakes and the electric brake on the locomotive are effective at the same time slipping and undesired wear of the locomotive wheels may occur, but under certain conditions it is desirable to be able to apply the fluid pressure brakes on the locomotive when the electric brake is effective.

The principal object of the invention is therefore the provision of an improved locomotive brake equipment embodying both fluid pressure and electric braking means, and interlock means automatically operative when the electric braking means is effective to prevent an automatic application of the fluid pressure brakes on the locomotive, but which permits control of the fluid pressure brakes on the locomotive by operation of the independent portion of the engineer's brake valve device when the electric brake is effective.

Other objects and advantages will become apparent from the following more detailed description of the invention.

In the accompanying drawings, Fig. 1 is a diagrammatic view, partly in section and partly in outline, of a combined pneumatic and electric brake apparatus for a locomotive; and Figs. 2 and 3 are sectional, diagrammatic views of a portion of an independent brake valve device shown in Fig. 1, but with the rotary valve thereof shown in different positions.

*Description*

As shown in the drawing the pneumatic brake apparatus for the locomotive comprises a distributing valve device 1, an engineer's brake valve device comprising an automatic portion 2 and an independent portion 3, a main reservoir 4 and a brake cylinder device 5.

The electric brake apparatus comprises a propulsion motor 6 adapted to be operated as a generator for supplying electric current to a dynamic braking resistor 7 for providing a decelerating force for braking purposes. The reference numeral 8 designates an engineer's controller having a power-on position and a dynamic brake on position as indicated by suitable legends. In the power-on position a contact 9 in the controller bridges a pair of contacts 10 and 11 for completing a circuit for supplying current to the motor 6, said circuit being by way of example from an overhead conductor 12 through a trolley 13, a conductor 14, the contact 9, a conductor 15, motor 6, and a grounded conductor 16. In the dynamic brake-on position a contact 17 will bridge contacts 11 and 18 for placing motor 6 in a dynamic braking circuit including resistor 7 which is effective to produce dynamic braking upon operation of the motor 6 as a generator, in a well known manner.

The distributing valve device 1 comprises an equalizing portion 20, an application portion 21, a reduction chamber cut-off valve device 22, a release valve device 23 and a safety valve device 24 all of which parts are carried by a pipe bracket 25 in which there is provided a reduction chamber 26. Also carried by the pipe bracket 25 is a controlled emergency or delay valve device 27. The pipe bracket 25 is in turn carried by a reservoir portion in which there is provided a pressure chamber 28 and an application chamber 29.

The distributing valve device 1, the engineer's brake valve device including the automatic portion 2 and independent portion 3 and other parts of the pneumatic brake equipment are, with an exception which will hereinafter be particularly pointed out, substantially the same in construction and operation as the Westinghouse Air Brake Company's No. 8 ET locomotive brake equipment fully disclosed in their instruction pamphlet No. 5032—1 dated July 1943, and also substantially the same in operation as the locomotive brake equipment fully disclosed in Patent No. 2,009,841 issued to Ellis E. Hewitt on July 30, 1935. Only such portions of the locomotive brake equipment are therefore disclosed and only the portions of the operation of said equipment are described in this application, which are essential to an understanding of the improvement provided by this invention.

The application portion 21 of the distributing valve device comprises an application piston 31, a baffle piston 32 spaced from and connected to the application piston, and an operating stem 33 projecting from the baffle piston into a valve chamber 34 which is connected by a passage 35 and a pipe 36 to the brake cylinder device 5. At one side of the application piston 31 is a control chamber 36, commonly known as the application cylinder, which is connected by a passage 37 extending through the pipe bracket 25 to the delay valve device 27. Between the application piston 31 and baffle piston 32 is a chamber 38 which is open through a stabilizing choke 39 to the brake cylinder passage 35. A brake cylinder release valve 40 contained in valve chamber 34 is loosely mounted between two spaced shoulders 41 on the piston stem 33 for movement by the application piston 31. The valve 40 is provided for controlling communication between chamber 34 and thereby the brake cylinder device 5, and an atmospheric port 42. The application portion of the distributing valve device further comprises a fluid pressure supply valve 43 contained in a chamber 44 which is connected by a passage 45 to a pipe 46 leading to the main reservoir 4, whereby said chamber is adapted to be constantly supplied with fluid under pressure from said reservoir. A seat 47 is arranged to be engaged by the supply valve 43 for closing communication between chamber 44 and the valve chamber 34. A spring 48 acts on the supply valve 43 for urging it into contact with the seat 47. The supply valve 43 is arranged in coaxial relation with the application piston stem 33 so that upon movement of piston 31 and said stem in the direction of the right hand the stem will pass through the opening encircled by the valve seat 47 and engage the supply valve 43 and then unseat said valve against the spring 48.

When the application piston chamber 36 is open to atmosphere, the parts of the application valve device 21 will assume a position in which the supply valve 43 is seated and the release valve 40 is in a position opening communication between valve chamber 34 and the atmospheric port 42 for thereby effecting a release of fluid under pressure from said brake cylinder device 5 and a release of the locomotive brakes. Upon supply of fluid under pressure through passage 37 to the application piston chamber 36 the application piston 31 will move in the direction of the right hand and after a certain degree of such movement the left hand shoulder 41 will engage the release valve 40. Further movement of the application piston 31 will then shift the release valve 40 to a position for closing communication between valve chamber 34 and the atmospheric port 42. Still further movement of the application piston 31 by pressure of fluid in chamber 36 will bring stem 33 into engagement with the supply valve 43 and open said valve against the pressure of spring 48 whereupon fluid under pressure from the main reservoir present in chamber 44 will flow to valve chamber 34 and thence through passage 35 and pipe 36 to the brake cylinder device 5 for effecting an application of the locomotive brake. As fluid under pressure is thus supplied to the brake cylinder device 5 by way of passage 35 fluid under pressure will also flow from said passage through choke 39 into chamber 38 and therein act on the application piston 31 in opposition to the pressure of fluid in control chamber 36, the pressure of fluid in said control chamber being also opposed by the pressure of fluid in valve chamber 34 acting on the baffle piston 32. When the pressure of opposing fluid in chambers 34 and 38 increases to a degree slightly in excess of the control pressure in chamber 36, the application piston 31, and piston 32 and thereby the piston stem 33 will be moved in the direction of the left hand relative to the exhaust valve 40, due to the lost motion connection between said valve and the two shoulders 41, until the right hand shoulder 41 engages said valve. This movement of the application piston 31 will permit closing of the supply valve 43 by spring 48 to prevent further flow of fluid under pressure to the brake cylinder device 5 for limiting the increase in pressure therein and in valve chamber 34 and in chamber 38 to a degree substantially equal to that in the application piston chamber 36, whereupon with the right hand shoulder 41 in contact with the release valve 40 movement of piston 31 will cease in what is known as a lap position.

If the pressure of fluid in the application piston chamber 36 is reduced by releasing it through passage 37 the greater pressure then present in chambers 34 and 38 will move piston 31 and the exhaust slide valve 40 back to release position to open chamber 34 to the exhaust port 42 whereupon fluid under pressure will be released from the brake cylinder device 5 to effect a release of the locomotive brakes.

The equalizing portion 20 is provided for supplying fluid under pressure from pressure chamber 28, which is normally charged with fluid under pressure, to passage 37 leading to the application piston chamber 36 and for releasing fluid under pressure from said chamber 36, said equalizing valve device comprising a piston 50 having at one side a chamber 51 which is open through a passage 52 to the usual train brake pipe 53 connected to the automatic portion 2 of the engineer's brake valve device. At the opposite side of piston 50 is a valve chamber 54 connected through a passage 55, a chamber 56, and a passage 57 to the pressure chamber 28. The valve chamber 54 contains a main slide valve 58 loosely mounted between spaced shoulders 59 and 60 on a stem 61 projecting from the equalizing piston 50. Mounted to slide on slide valve 58 is an auxiliary slide valve 62 which is disposed in a recess in the piston stem 61 for movement therewith.

The equalizing piston 50 and slide valves 58 and 62 have, as well known, a release position for releasing fluid under pressure from the application piston chamber 36 and for charging the pressure chamber 28 with fluid under pressure from the brake pipe 53, a service position for supplying fluid under pressure from the pressure chamber 28 to the application piston chamber 36 and to the application chamber 29 to effect an automatic service application of brakes, a lap position for cutting off the supply of fluid under pressure to the two last named chambers and for bottling the fluid pressure therein, and an emergency position for supplying fluid under pressure from the pressure chamber 28 to the application piston chamber 36 to effect an automatic emergency application of brakes. Also, as well known, the position of the equalizing piston 50 and slide valves 58 and 62 is determined by the pressure of fluid in piston chamber 51 and in the brake pipe 53, as in turn controlled by operation of the automatic portion 2 of the engineer's brake valve device, whereby when the brake pipe is fully charged said parts will assume their release position, while upon a service reduction in pressure in the brake pipe effected by operation of the engineer's brake valve device said parts will assume their service position, while upon an emergency reduction in pressure in the brake pipe effected by the engineer's brake valve device said parts will assume their emergency position. The release and lap positions of the equalizing piston 50 and associated slide valves are not pertinent to an understanding of the invention and will not be further described and no further description of the well known operation of the automatic portion 2 of the engineer's brake valve portion 2 to control operation of equalizing piston 50 and of the slide valves 58 and 62 is essential to an understanding of the invention.

The reduction chamber cut-off valve device 22 comprises a slide valve 66 contained in a chamber 67 and a piston 68 connected to said slide valve for moving it to two different positions including a cut-off position in which it is shown in the drawing and which it will assume with the equalizing piston 50 and the slide valves 58 and 62 in their service and emergency positions, above described. In the cut-off position of slide valve 68 a cavity 69 in said valve establishes a communication between a passage 64 leading to the seat of the equalizing slide valve 58 and a passage 70 which is connected to a passage 71 leading to the seat of slide valve 58 and also to the mounting face on the pipe bracket 25 for the delay valve device 27. A passage 72 connects passage 70 to a check valve chamber 73 in the release valve device 23.

The check valve chamber 73 in the release valve device 23 contains a check valve 74 for controlling communication between said chamber and a chamber 75 which is connected by a passage 76 to an application pipe 77 leading to the engineer's brake valve device in which a pipe 78 and a passage 79 connects pipe 77 to the independent portion 3 of said brake valve device. A spring 80 in chamber 73 acts on the check valve 74 for urging it into contact with a seat. The release valve device 23 further comprises a piston 81 having at one side a chamber 82 which is connected by a passage 83 to an independent brake release pipe 84, said pipe extending to the engineer's brake valve device and being connected by a pipe 85 and a passage 86 therein to the independent portion 3 of said brake valve device. At the opposite side of the release valve piston 81 is a chamber 87 open to atmosphere through a vent port 88, and projecting from said piston through said chamber and a bore in the casing and into chamber 75 is a stem 89 arranged to engage the check valve 74 to unseat said valve upon movement of piston 81 in the direction of the left hand. A spring 90 in chamber 75 acts on stem 89 for moving said stem and piston 81 to the position in which they are shown in the drawing to permit closing of the check valve 74 by spring 80. The check valve 74 is closed at all times to prevent release of fluid under pressure from chamber 73 to chamber 75 except when it is desired to effect an independent release of locomotive brakes, as will be hereinafter described.

In service position of the equalizing piston 50 and slide valves 58 and 62 a service port 63 extending through the slide valve 58 connects passage 64 past the left hand end of the slide valve 62 to valve chamber 54 so that fluid under pressure from valve chamber 54 and pressure chamber 28 may flow to passage 64 and thence through cavity 69 in the reduction cut-off slide valve 68 to passages 70 and 71, the latter passage leading to the mounting face for the delay valve device 27 as well as to the seat of the equalizing slide valve 58. A cavity 96 in the equalizing slide valve 58 connects passage 71 to a passage 97 leading to the application chamber 29, while a passage 98 connects passage 97 to the mounting face on the pipe bracket 25 for the delay valve device 27. A cavity 97a in the auxiliary slide valve 62 connects a passage 98a from cavity 96 in the slide valve 58 to a passage 99 in the last named slide valve, the passage 99 being in turn connected to a passage 100 in the casing which leads to the safety valve device 24.

In emergency position of the equalizing piston 50 and slide valves 58 and 62 a port 101 which is constantly open through the right hand end of the main slide valve 58 to valve chamber 54 is connected to both passages 64 and 100, while the passage 55 is connected through cavity 96 in the main slide valve 58 to passage 71, passage 97 from the application chamber 29 being lapped by the slide valve 58 in emergency position. In the emergency position of the equalizing slide valves 58 and 62 the safety valve device 24 remains connected to passage 71 the same as in the service position.

It will thus be seen that in both the service and emergency positions of the equalizing piston 50 and slide valves 58 and 62 fluid under pressure is permitted to flow from the pressure chamber 28 to passage 71 leading to the mounting face on the pipe bracket 25 for the delay valve device 27, to the safety valve device 24 which is effective in both of said positions to limit the pressure of fluid in passage 71, while the application chamber 29 is connected to passage 71 in service position but not in emergency position of said slide valves.

Interposed between the delay valve device 27 and the mounting face on pipe bracket 25 for said device is a filler piece 102 constituting a part of the present invention.

The delay valve device 27 comprises a piston 103 having at one side a chamber 104 and having at the opposite side a valve chamber 105 containing a slide valve 106 arranged to be moved by said piston to two different positions, namely, a position for short train operation in which these parts are shown in the drawing, and a position for long train operation in which the piston and slide valve will be moved down until said piston contacts a shoulder 107 in the casing. The valve chamber 105 is adapted to be constantly supplied with fluid under pressure from the main reservoir 4 by way of the main reservoir pipe 46 and a passage 108. Chamber 104 at the opposite side of piston 103 is adapted to either be charged with fluid under pressure from the main reservoir or to be open to atmosphere through a passage 109, a pipe 110 and a selector valve 111 associated with the engineer's brake valve device. When chamber 104 is open to atmosphere the piston 103 and slide valve 106 will assume their short train position under pressure of fluid effective in valve chamber 105, while upon supply of fluid at main reservoir pressure to piston chamber 104 a spring 112 therein will move the piston 103 and slide valve 106 to their lower or long train position.

It will be noted that the filler piece or block 102 is provided with through passages 113 and 114 establishing communications between passages 108 and 109 in the pipe bracket 25 to correspondingly numbered passages in the delay valve device 27. Passage 98 in the pipe bracket 25 is connected by a passage 115 in the filler piece 102 to a passage 116 in the delay valve device 27, the passage 116 leading to the seat of the delay slide valve 106. A check valve 117 is provided in passage 115 to prevent flow of fluid under pressure in the direction from passage 98 to the delay valve device, but to permit flow in the reverse direction. Passage 37 from the application piston chamber 36 is connected by a passage 118 in filler piece 102 to a passage 119 in the delay valve device, the latter passage opening to the seat of the delay slide valve 106. In the delay valve device a passage 119a opening at the seat of slide valve 106 is connected to a passage 120 in the filler piece 102, the passage 120 being in turn connected to a pipe 121. Passage 120 in the filler piece 102 is also connected through a choke 122 in said filler piece to a passage 123 leading to passage 119. Passage 71 in the pipe bracket 25 is connected to a passage 124 in the filler piece 102 and thence to a pipe 125.

The delay slide valve 106 has a cavity 126 which in the short train position of said valve establishes communication between passage 119 and passage 119a. In the long train position of the delay slide valve 106 cavity 126 is moved out of registry with passage 119a under which condition communication between passages 120 and 119 is maintained through the choke 122. Also in this long train position of the delay slide valve 106 a cavity 127 in said valve establishes communication between passage 119 from the application piston chamber and passage 116 which is connected to the application chamber 29.

From the above description it will be noted that interposing the filler piece 102 between the delay valve device 27 and the pipe bracket 25 merely intercepts the connection between passage 71 in the pipe bracket and passages 119a and 123 in the relay valve device and provides a means for connecting passage 71 to a pipe 125, and passages 119a and 123 to pipe 121, the filler piece further providing for disposal of the check valve 117 in passage 115 between the passages 98 and 116.

The pipe 121 leads to the side outlet of a double check valve 128 the opposite ends of which are connected respectively to pipes 129 and 130, pipe 129 being connected to the independent application pipe 77. The pipes 130 and 125 lead to an interlock magnet valve device 131 which comprises an electromagnet 132 connected in series with the dynamic brake resistor 7 so as to be energized during dynamic braking and de-energized at other times. The magnet valve device 131 further comprises two oppositely arranged poppet valves 133 and 134 contained in chambers 135 and 136 which are open respectively to pipe 125 and to atmosphere through a port 137. The two poppet valves 133 and 134 are arranged for movement in unison so that when one is closed the other will be open, the valve 133 being arranged to control communication between pipes 125 and 130 and the valve 134 being arranged to control communication between the latter pipe and atmosphere through port 137. A spring 138 in chamber 136 acts on valve 134 for closing said valve and for opening the valve 133 when the electromagnet 132 is de-energized. When electromagnet 132 is energized however, the valve 133 will be closed and the valve 134 open.

The independent portion 3 of the engineer's brake valve device comprises a rotary valve 140 and a hand operated lever 141 operatively connected to said valve through a key 142 for turning said valve to its usual positions including a normal or running position in which it is shown in Fig. 1, an independent application position in which it is shown in Fig. 3 and an independent release position in which it is shown in Fig. 2 of the drawings. In running position of the rotary valve 140 a cavity 143 therein connects the independent release pipe 84 to an exhaust passage 144 for releasing fluid under pressure from piston chamber 82 of the release valve device 23 in the distributing valve device 1. In the independent application position of rotary valve 140, shown in Fig. 3 of the drawings, a cavity 145 in said valve connects the independent release pipe 84, to the atmospheric port 144, while a port 146 through the rotary valve connects passage 79 from the independent application pipe 77 to a chamber 147 above the rotary valve, which chamber is normally supplied with fluid under pressure, as well known. In the independent release position of rotary valve 140 passage 79 from the application pipe 77 is opened to atmosphere through a cavity 148 in said valve and the atmospheric port 144, while a port 149 in said valve establishes communication between chamber 147 and passage 86 connected to the independent release pipe 84.

In operation, when the equalizing portion 20 of the distributing valve device is in either its service or emergency position for effecting an automatic application of the locomotive brakes, and the dynamic brake is ineffective, the fluid under pressure supplied from the pressure chamber 28 to passage 71 in the distributing valve device will flow from said passage through passage 124 in filler piece 102, pipe 125, past the open valve 133 in the interlock magnet valve device 131 to pipe 130 leading to the left hand face of the double check valve 128. The double check valve 128 will be shifted to its right hand position by the pressure of fluid in pipe 130 to open communication between said pipe and pipe 121 whereupon fluid under pressure will flow to pipe 121 and thence through passage 120 in the filler piece 102 to passage 118 in said filler piece either by way of passage 119a in the delay valve device, cavity 126 in the delay slide valve 106 and passage 119 or through choke 122 and passage 123 and passage 119, and from passage 118 to passage 37 leading to the application piston chamber 36 for thereby effecting operation of the application portion 21 of the distributing valve device to supply fluid under pressure to the brake cylinder device 5 for applying the locomotive brakes.

If the dynamic brake is effective causing energization of the interlock magnet valve device 131 when the equalizing portion 20 of the distributing valve device is operated to supply fluid under pressure to passage 71 and thence to pipe 125 for effecting an automatic application of the locomotive brakes as just described, such an application will be prevented due to valve 133 in the interlock magnet valve device 131 being closed to prevent flow of fluid under pressure from pipe 125 to pipe 130 and thence to the application piston chamber 36. If due to operation of the equalizing portion of the distributing valve device the locomotive brakes are applied at the time the dynamic brake is rendered effective the closing of valve 133 in the interlock magnet valve device 131 will prevent further flow of fluid under pressure from the equalizing portion 20 of the distributing valve device through pipe 125 to pipe 130 and thence to the application piston chamber 36, and at the same time will connect said chamber to atmosphere past the open valve 134 so as to thereby release the pneumatic brakes on the locomotive.

It will now be seen that normally, that is, with the independent portion 3 of the engineer's brake valve device in its running position, the pneumatic brakes and the dynamic brake on the locomotive cannot both be effective at the same time since the dynamic brake when first effective will prevent an application of the pneumatic brake, and will cause release of the pneumatic brakes in case the pneumatic brakes have been applied prior to the dynamic brake becoming effective.

The check valve 117 in the filler piece 102 is provided to prevent flow of fluid from the pressure chamber 28 and passage 98 to passage 37 and thence to the application piston chamber 36 when the equalizing portion 20 of the distributing valve device is in service position and the delay slide valve 106 is in its lower position, in order that energization of the interlock magnet valve device 131 may prevent application of the pneumatic brakes when the dynamic brake is effective.

When the dynamic brake is effective preventing flow of fluid under pressure from pipe 125 to pipe 121 and thence to the application piston chamber 36 for preventing an application of locomotive brakes, pipe 130 connected to the left hand end of the double check valve 128 is open to atmosphere past the valve 134 in the interlock magnet valve device 131, as above mentioned. Consequently if it should become desirable for the engineer to effect an independent application and release of the brakes on the locomotive at the same time as the dynamic brake is effective he may do so by suitable operation of the independent portion 3 of the brake valve device. To apply the locomotive brakes under this condition, the engineer may move the rotary valve 140 in the independent portion of the brake valve device to its independent application position, shown in Fig. 3, for supplying fluid under pressure from rotary valve chamber 147 through port 146 in the rotary valve to passage 79 and thence to the application pipe 77. Fluid thus supplied to the application pipe 77 will then shift the double check valve 128 to its right hand position to open communication between pipes 129 and 121 whereupon fluid under pressure will flow to the latter pipe and thence to the application piston chamber 36 and effect operation of the application portion 21 of the distributing valve device to supply fluid under pressure to the brake cylinder device 5 to apply the locomotive brakes. To subsequently release an application of brake effected by operation of the independent portion 3 of the brake valve device as just described, the operator will move the independent portion 3 of the brake valve device to its independent release position, shown in Fig. 2, for opening to atmosphere passage 79, whereupon with the double check valve 128 still in its right hand position fluid under pressure will be released from the application piston chamber 36 to atmosphere by way of passage 37, through the delay valve device 27, pipe 121 and pipes 129 and 77 as will be apparent.

When the application portion 21 of the distributing valve device is operated to effect an automatic application of brakes due to operation of the equalizing portion 20 of the distributing valve device upon a reduction in pressure in the brake pipe 53, the supply of fluid to the application piston chamber 36 is by way of the right hand end of the double check valve 128, as before described. Under this condition the double check valve 128 will be closing communication between pipes 129 and 121, so that the automatic application of brakes effected in response to operation of equalizing portion 20 of the distributing valve device cannot be released, in the manner just described, by moving the independent portion 3 of the brake valve device to its independent release position. Under such a condition the brakes on the locomotive will be released in the independent release position of the independent brake valve device in the conventional manner however, since in this position of the rotary valve 140 fluid under pressure will be supplied from chamber 147 through port 149 in said valve to passage 86 and thence through the independent release pipe 84 to the release valve piston chamber 82 in the distributing valve device. The release piston 81 will thereby be operated to open the check valve 74 to establish communication between passage 72, which at this time will be connected to the application piston chamber 36 through the de-energized interlock magnet valve device 131, past the right hand end of the double check valve 128 and through the delay valve device 27, and passage 76 which is connected to the application pipe 77 and which in turn is open to atmosphere through cavity 148 in the rotary valve 140 and the vent port 144, whereupon fluid under pressure will be released from the application piston chamber 36 even with the double check valve 128 in its right hand position.

From the above description it will now be seen that when the dynamic brake on the locomotive is effective an automatic application of the pneumatic brakes on the locomotive will be prevented upon operation of the equalizing portion 20 of the distributing valve device in response to a reduction in brake pipe pressure, until the dynamic brake effectiveness is reduced to a degree to permit de-energization of magnet 132 of the interlock magnet valve device 131. If an automatic application of the pneumatic brakes is effected in response to a reduction in brake pipe pressure before the dynamic brake is rendered effective, then operation of the dynamic brake to brake the locomotive will automatically cause operation of the interlock magnet valve device 131 to effect a release of the pneumatic brakes. When the pneumatic brake is released however, with the dynamic brake effective, said pneumatic brake may be applied and released, if desired, or if necessary, by operation of the independent brake valve portion 3 of the engineer's brake valve device, it being noted that this independent control of the locomotive pneumatic brakes is independent of and not controlled by the interlock magnet valve device 131.

Having now described the invention what I claim as new and desire to secure by Letters Patent is:

1. In a locomotive brake equipment, in combination, fluid pressure operative means for braking said locomotive, a brake pipe, control valve means operable upon a reduction in brake pipe pressure to effect a supply of fluid under pressure to said fluid pressure operative means, an engineer's automatic brake valve device for reducing the pressure in said brake pipe, an engineer's independent brake valve device for supplying fluid under pressure to said fluid pressure operative means, a double check valve device interposed in the connection between said fluid pressure operative means and said control valve means and said independent brake valve device and operable upon supply of fluid under pressure by said control valve means to open communication therebetween and said fluid pressure operative means and to close communication between said fluid pressure operative means and said independent brake valve device and operable upon operation of said independent brake valve device to supply fluid under pressure to open communication therebetween and said fluid pressure operative means and to close communication between said fluid pressure operative means and said control valve means, electric braking means for braking said locomotive, and means responsive to action of said electric braking means to close communication between said control valve means and said double check valve device and upon de-energization of said electric braking means to open the last named communication.

2. In a locomotive brake equipment, in combination, fluid pressure operative means for braking said locomotive, two separate valve means independently operative for supplying fluid under pressure to effect operation of said fluid pressure operative means, a double check valve interposed in the connection between said fluid pressure operative means and said two valve means, and selectively operable by fluid under pressure supplied by either one of said valve means to open communication therebetween and said fluid pressure operative means and to close communication between said fluid pressure operative means and the other valve means, electric braking means operative upon energization to brake said locomotive, and means controlling communication between one of said valve means and said double check valve controlled by said electric braking means and operable upon energization thereof to close communication between said one valve means and said double check valve and to open to atmosphere the portion of the communication connected to said double check valve and operable upon de-energization to open said communication between said one valve means and said double check valve.

3. In a locomotive brake equipment, in combination, a brake pipe, a distributing valve device comprising an application portion operable by fluid under pressure to effect an application of locomotive brakes and operable upon release of fluid under pressure to effect a release of locomotive brakes, an equalizing portion operable upon a reduction in pressure in said brake pipe to supply fluid under pressure to said application portion, an automatic brake valve device for reducing the pressure in said brake pipe, electric braking means for said locomotive operable upon energization to brake said locomotive, interlock means controlling communication between said equalizing portion and said application portion operable upon energization of said electric braking means to close said communication and to release fluid under pressure from said application portion and operable upon de-energization of said electric braking means to open said communication, an independent brake valve device for supplying fluid under pressure to and for releasing fluid under pressure from said application portion, and means operable upon operation of said independent brake valve device to supply fluid under pressure to said application portion to prevent release of fluid under pressure from said application portion by said interlock means.

4. In a locomotive fluid pressure brake equipment, in combination, a brake pipe, a distributing valve device comprising an application portion operable by fluid under pressure to effect an application of locomotive brakes and operable upon release of fluid under pressure to effect a release of locomotive brakes, an equalizing portion operable upon a reduction in pressure of fluid in said brake pipe to supply fluid under pressure to a fluid pressure supply communication, an automatic brake valve device for reducing the pressure of fluid in said brake pipe, an independent application pipe, an independent brake valve device having an independent application position for supplying fluid under pressure to said independent application pipe, a double check valve subject to opposing pressures of fluid in said fluid pressure supply communication and in said independent application pipe and operable upon supply of fluid under pressure to either one to open communication therebetween and said application portion and to close communication between the other and said application portion, electric braking means for said locomotive operable upon energization to brake said locomotive, interlock means controlled by said electric braking means controlling communication through said fluid pressure supply communication to said double check valve and operable upon energization of said electric braking means to close the communication and to open to atmosphere the connection between said interlock means and said double check valve and operable upon de-energization to open the communication, conduit means connecting said fluid pressure supply communication to said independent application pipe, a check valve in said conduit means arranged to prevent flow of fluid under pressure from said fluid pressure supply communication to said independent application pipe, a piston adapted to be operated by fluid under pressure for actuating said check valve to open communication through said conduit means, an independent release pipe for supplying fluid under pressure to actuate said piston, said independent brake valve device having another position for opening said independent application pipe to atmosphere and for supplying fluid under pressure to said independent release pipe.

5. In a locomotive fluid pressure brake equipment, in combination, a brake pipe, a distributing valve device comprising a pipe bracket, an application portion mounted on said pipe bracket and operable upon supply of fluid under pressure thereto through an application passage in said bracket to effect an application of locomotive brakes, an equalizing portion mounted on said pipe bracket operable upon a reduction in pressure in said brake pipe to supply fluid under pressure to a supply communication in said bracket for supply to said application portion, said application passage and supply communication leading to a mounting face on said bracket, a filler piece mounted on said mounting face, a delay valve device mounted on said filler piece, an application pipe connected to said filler piece and therethrough to said delay valve device, said delay valve device comprising means for establishing a fluid pressure flow communication between said application pipe and said application passage, another application pipe connected to said filler piece, means in said filler piece establishing communication between said other application pipe and said supply communication, valve means controlling communication between the two application pipes and selectively operable to either open such communication or to close such communication, electric braking means for said locomotive operable upon energization to brake said locomotive, and means operable upon energization of said electric braking means to effect operation of said valve means to close communication between said application pipes and upon deenergization to effect operation of said valve means to open such communication.

6. In a locomotive fluid pressure brake equipment in combination, a brake pipe, a distributing valve device comprising a reservoir portion having a normally charged pressure chamber and having an application chamber normally at atmospheric pressure, an application portion operable upon supply of fluid under pressure to an application passage to effect an application of locomotive brakes, an equalizing portion operable upon a reduction in pressure of fluid in said brake pipe to establish a communication between said chambers and to at the same time open said chambers to an application communication, a delay valve for establishing a communication between said application chamber and said application passage, a check valve in the last named communication arranged to prevent flow of fluid under pressure in the direction from said application chamber, an application pipe connected to said application communication, another application pipe connected to said application passage, electric braking means for said locomotive operable upon energization to brake said locomotive, valve means controlling communication between the two application pipes and operable upon energization of said electric braking means to close such communication and upon deenergization to open such communication.

HARRY M. LINHART.

REFERENCES CITED

The following references are of record in the file of this patent:

UNITED STATES PATENTS

| Number | Name | Date |
|---|---|---|
| 1,400,839 | Turner | Dec. 20, 1921 |
| 1,621,403 | Hamilton | Mar. 15, 1927 |